United States Patent [19]

Carossino

[11] 4,261,558

[45] Apr. 14, 1981

[54] DEVICE FOR LATERALLY CLAMPING WORKPIECES ON A MACHINE TOOL

[76] Inventor: André Carossino, 88 Route de la Princesse, 78430 Louveciennes, France

[21] Appl. No.: 43,213

[22] Filed: May 29, 1979

[30] Foreign Application Priority Data

Jun. 1, 1978 [FR] France ........ 78 16422

[51] Int. Cl.$^3$ ........ B23Q 3/02

[52] U.S. Cl. ........ 269/91; 269/134; 269/275

[58] Field of Search ........ 269/134–138, 269/254 R, 275, 91, 94, 239, 244

[56] References Cited

U.S. PATENT DOCUMENTS

| | | | |
|---|---|---|---|
| 626,427 | 6/1899 | Jones | 269/266 |
| 2,365,079 | 12/1944 | Huber | 269/94 |
| 2,526,020 | 10/1950 | Fuhr | 269/134 |
| 3,020,041 | 2/1962 | Peterson et al. | 269/275 |
| 3,052,461 | 9/1962 | Bateman | 269/275 |

*Primary Examiner*—Robert C. Watson
*Attorney, Agent, or Firm*—Kenyon & Kenyon

[57] ABSTRACT

The invention concerns a device for laterally clamping workpieces to be machined to a machine tool and in particular for clamping awkwardly-shaped or high workpieces.

The device is characterized in that it comprises at least one slide provided with an anchoring element movable in translation in the slide by the thrust exerted by pressure-applying means, the active part of the anchoring element, projecting from the front face of the slide, having at least one rigid abutment zone and a slightly flexible zone.

7 Claims, 5 Drawing Figures

DEVICE FOR LATERALLY CLAMPING WORKPIECES ON A MACHINE TOOL

The invention relates to a device for laterally clamping workpieces to be machined on a machine tool, and in particular for the clamping of awkwardly-shaped workpieces or workpieces of great height.

Devices are already know for vertically clamping workpieces which are even of great height (see in this respect French Patent Applications No. 77.07.067 of Mar. 10, 1977, and No. 78.01.765 of Jan. 23, 1978, belonging to the applicant). However, these devices, which employ a pressure-applying finger member which bears on the upper face of the workpiece, cannot be employed in the case of awkwardly-shaped workpieces or above all workpieces which must be machined or their surface in respect of which the pressure-applying finger members would constitute a hindrance to the machining operation, that is to say, to the passage of the tool. It is therefore usual in such a case to employ lateral clamping devices which bear against the lateral faces of the workpiece. However, all the known devices of this type have the crawback of providing a clamping which is little reliable, especially when they are intended to clamp high work pieces. Indeed, in this case, as the clamping occurs only at the base of the workpiece, the latter, if it is relatively high, has a tendency to "tilt" under the effect of the cuts of the tool which may result in its unclamping with all the imaginable consequences, in particular as concerns the serious danger of an accident.

The object of the invention is to overcome these drawbacks and to provide a device which, by its designs and its facility of adaptation, permits a reliable and effective clamping of all workpieces to be machined irrespective of their shapes and heights.

The invention therefore relates to a device for laterally clamping workpieces to be machines to a machine tool, characterized in that it comprises at least one slide provided with an anchoring element movable in translation in the slide by the thrust of a pressure-applying means, the active part of the anchoring element projecting from the front face of the slide comprising at least one rigid abutment zone and a slightly flexible part.

According to a preferred embodiment, the anchoring element is made from spring steel and is associated with a control screw which is held stationary axially but is rotatable, the active part of this element being formed by three finger members bent downwardly, the middle finger member being set back relative to the two contiguous lateral finger members and being reinforced so as to form a rigid abutment zone whereas the two lateral finger members are thin so as to be slightly flexible and are set back with respect to the bottom face of the anchoring element so as to be capable of slightly downwardly deforming by bending.

According to a feature of the invention, there are employed for the lateral clamping of high workpieces a plurality of superimposed slides, each of the slides comprising a male part and a female part of complementary shape for mutual coupling, a locking pin being provided in each slide for partial penetration in the adjacent slide so as to avoid and rearward displacement in the course of clamping.

A clamping device according to the invention is shown merely by way of example in the accompanying figures in which.

Figure 2:
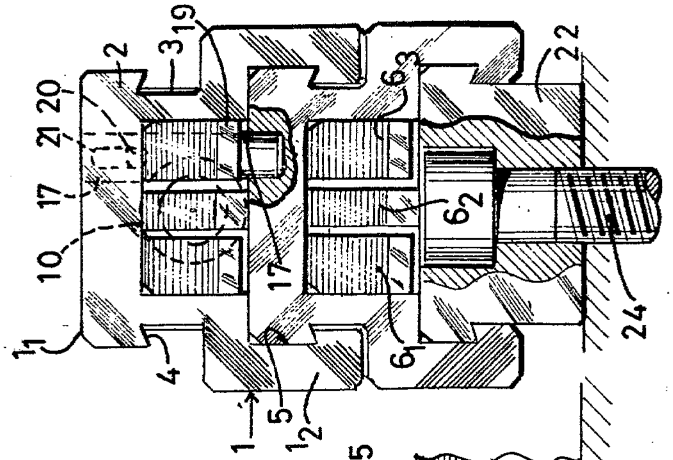
FIG. 2 is a left sectional view of FIG. 1.

The main purpose of the invention is to provide a special design of a lateral clamping device for fixing to the table of a machine tool workpieces which are to be machined, whatever the shape of their contour and above all whatever their height.

This device mainly comprises a stirrup shaped section member hereinafter termed a slide. This slide 1, whose sectional shape is more particularly seen in FIG. 2, has a male part $1_1$ and a female part $1_2$ of complementary shape. The male part is in the shape of a parallel sided head provided on its two lateral edges with two shoulders 2 which project from the lateral face 3. These two shoulders are connected to the lateral face 3 by two slightly inclined edge portions 4. The female part has internally a cavity 5 whose sectional shape is complementary to that of the head $1_1$. Each slide is in the form of a section of a section member and may be assembled with a continuous slide merely by fitting the male part of one slide in the female part of the other.

Each slide is provided with an anchoring element 6 which is mounted to be reciprocatable in a cavity 7 formed in the head $1_1$ of the slide. This cavity 7 extends only along a part of the length of the slide, the rear part of the latter being closed by a wall 8 provided with a circular orifice 9 allowing the passage of a control screw 10. The head 11 of this screw projects from the front face 12 of the slide and its front part having the screw thread cooperates with a tapped orifice 13 formed in the anchoring element 6. This screw also has an annular shoulder 14 which bears against the rear wall 8 of the slide at the end of the rearward travel.

Figure 1:
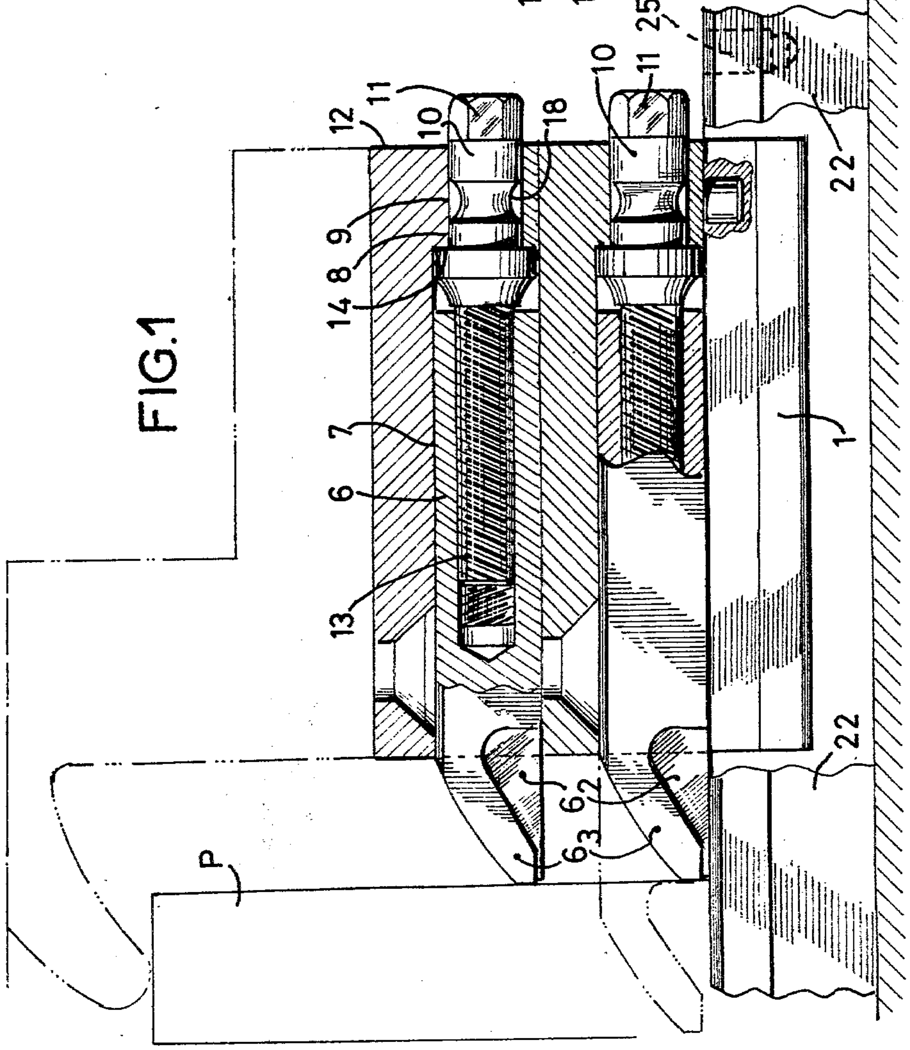
FIG. 1 is a longitudinal sectional view of two associated slides carried by a table of a machine tool.
Figure 3:
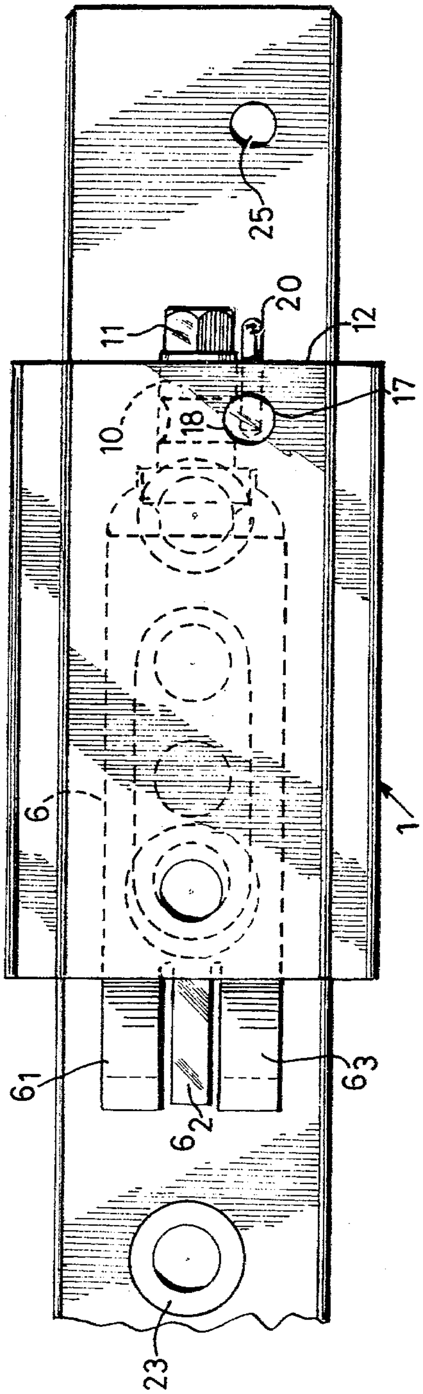
FIG. 3 is a diagrammatic plan view of FIG. 1.
Figure 5:
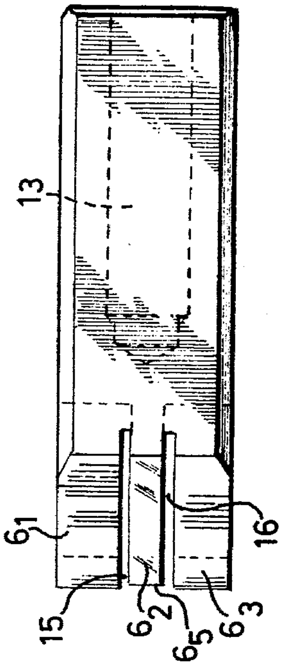
FIG. 5 is a top view of FIG. 4.
Figure 4:
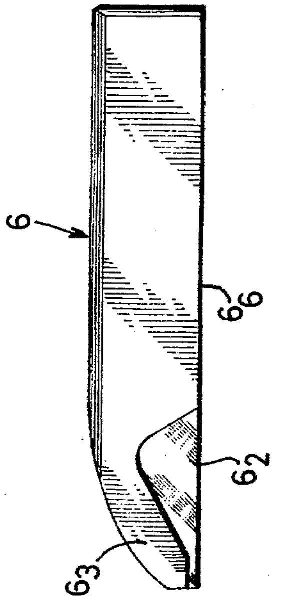
FIG. 4 is a plan view of the anchoring element.

The anchoring element 6 (FIG. 4 and FIG. 5) is in the form of a parallel-sided block whose front part, which is termed the active or operative part, is in the form of three finger members $6_1$, $6_2$ and $6_3$, these finger members being downwardly curved or bent and being obtained by simple saw cuts 15 and 16. According to an essential feature of the invention, the center finger member $6_2$ has a rib adapted to stiffen it and thereby constitute an abutment which will bear against the workpiece P (FIG. 1) when clamping. On the other hand, the two lateral finger members $6_1$ and $6_3$ are thin so as to be slightly flexible, the anchoring element being for this purpose made from spring steel (steel 45 S 8). In order to enable the flexible finger members to be deformed downwardly by bending under the clamping thrust exerted on this anchoring element, the finger members $6_1$–$6_3$ slightly project from the front face $6_5$ of the middle finger member $6_2$ and are also set back with respect to the reference plane $6_6$ formed by the bottom face of the work element 6. This design ensures that the lateral finger members $6_1$ and $6_3$ are the first to come in contact with the workpiece to be clamped and are capable of being downwardly deformed until they become flush with the level of the bottom face $6_6$ of the anchoring element. At this stage, the two finger members $6_1$ and $6_3$, and more particularly the front face, are substantially in the plane of the front face $6_5$ of the middle finger member $6_2$ so that the three finger members symmetrically bear against the workpiece to be clamped. The flexibility of the metal and in particular the flexibility of the lateral finger members $6_1$, $6_3$ increase, by a simple bending, the buttressing pressure of the three anchoring finger members on the workpiece.

If the workpiece P to be clamped is relatively high, it is possible, owing to the design of the slides 1, to stack a plurality of these slides, that is to say, assemble them by sliding so as to form stages as shown in FIG. 2. The slides are mutually held stationary by the pins 17 which also serve, as mentioned before, to hold the screw 10 axially stationary. These pins are indeed disposed in apertures 19 which extend throughout the head of the slide so as to penetrate the identical orifice provided in the other adjacent slide. The downward displacement of the pin 17 is limited by a radial finger member 20 which is rigid with this pin and travels in a slot 21 which communicates with the front 12 of the slide. The radial finger member 20 is accessible from outside the slide so as to permit the uncoupling of the slides by a simple upward displacement of the pin 17 which is rendered possible by taking hold of the radial finger member 20.

The stacked slides may be fixed to a bed plate 22 having in section a shape which is complementary to the female part of the slide. This bed plate, which may be in the form of a section member has at certain points, anchoring orifices 23 which extend therethrough for the fixing of screws 24 which penetrate blocks (not shown) provided with tapped orifices and disposed in the conventional 6-slots of the table of the machine tool. These section members or bed plates 22 may be oriented in a plane which is parallel to, perpendicular to, or oblique to the slots of the table. Thus the user is no longer dependent on the shape of the slots of the table of the machine tool or their respective spacing and may move these slides as desired on the bed plates 22 irrespective of the shape of the workpiece, since the bed plates may be oriented in different directions. It is therefore possible, owing to this arrangement, to clamp workpieces having a shape which is other than a geometric shape by employing bars which are oriented in different directions, these bars being provided with orifices 25 for immobilizing the slide located at the base of the stack of slides, this immobilization being again achieved by the pin 17 which enters the orifices 25 of the base plate or bar 22 which is immobilized on the table of the machine tool by screws 24.

It is possible to combine this lateral clamping device with a vertical clamping device such as those disclosed and illustrated in the patent applications referred to in the preamble of this specification and belonging to the applicant. In this way there is achieved in a cumulative manner a lateral clamping of the workpiece on its lateral surfaces and at different heights and a vertical reliable clamping which thereby permits a machining in complete safety.

Of course, the invention is not limited to the embodiments described hereinbefore which are merely illustrative. Other modifications or other means therefore may be contemplated without departing from the scope of the invention.

I claim:

1. A device for laterally clamping workpieces to be machined on a machine tool comprising:

(a) at least one slide having an anchoring element movable in translation in said slide, said anchoring element being made from spring steel, the active part of the anchoring element projecting from the front of the slide and comprising three downwardly bent finger members, the middle finger member being set back with respect to the other two contiguous finger elements and being reinforced so as to form a rigid abutment zone, said two other finger members being thin so as to be slightly flexible and set back with respect to the bottom face of said anchoring element so as to be capable of being slightly downwardly deformed by bending; and (b) pressure applying means for applying a thrust to move said anchoring element slide in translation, in said slide.

2. A device for laterally clamping workpieces to be machined on a machine tool comprising:

(a) at least one slide having an anchoring element movable in translation in said slide, said anchoring element being made from spring steel, the active part of the anchoring element projecting from the front of the slide and comprising three downwardly bent finger members, the middle finger member being set back with respect to the other two contiguous finger elements and being reinforced so as to form a rigid abutment zone, said two other finger members being thin so as to be slightly flexible and set back with respect to the bottom face of the anchoring element so as to be capable of being slightly downwardly deformed by bending; and (b) a control screw disposed so that it is prevented from moving axial, but is rotatable, said screw forming pressure applying means for exerting a thrust to move said anchoring member in translation in said slide.

3. A device for laterally clamping workpieces to be machined on a machine tool comprising:

(a) a plurality of superimposed slides, each of said slides comprising a male part and a female part of complementary shape for the mutual coupling thereof, a movable locking pin being provided in each slide for partly penetrating the adjacent slide and avoiding any rearward displacement in the course of clamping, each of said slides having an anchoring element movable in translation, the anchoring elements of said slides projecting from the front faces thereof and comprising at least one rigid abutment zone and at least one slightly flexible part; and (b) pressure applying means for exerting a thrust to move said anchoring members in translation in said slides.

4. A device as claimed in claim 3 wherein each of said pins has a radial finger member which is slidable in a slot in said slide and projects outwardly.

5. A device as claimed in claim 1 wherein said pressure applying means comprises a control screw which is prevented from moving axial but is rotatable, said control screw having an annular groove into which said locking pin engages, said pin being oriented in a plane orthogonal to said screw.

6. A device as claimed in claim in any one of the claims 1–5 wherein said at least one slide has a male part and a female part of complementary shape, and further including at least one bed plate anchored to the table of the machine tool having a cross-sectional shape which is complementary to said female part of each slide, each slide mounted on said at least one bed plate.

7. A device as claimed in claim 6, wherein said bed plates comprise section members or bars fixed in the slots of the table of the machine tool in a plane which is parallel to, perpendicular to or inclined to said slots.

* * * * *